United States Patent [19]

Stuhldreher

[11] Patent Number: 5,579,882
[45] Date of Patent: Dec. 3, 1996

[54] CLUTCH ASSIST MECHANISM

[75] Inventor: Mark S. Stuhldreher, Commerce Twp., Mich.

[73] Assignee: Ford Motor Company, Dearborn, Mich.

[21] Appl. No.: 489,209

[22] Filed: Jun. 9, 1995

[51] Int. Cl.⁶ .............................. F16D 25/08; F16D 48/04
[52] U.S. Cl. .................. 192/85 C; 192/91 R; 192/109 F
[58] Field of Search .............................. 192/85 C, 91 R, 192/109 F, 52.5

[56] References Cited

U.S. PATENT DOCUMENTS

| | | | |
|---|---|---|---|
| 2,734,609 | 2/1956 | Fritzsch | 192/85 C X |
| 3,448,842 | 6/1969 | Nordstrom | 192/91 R |
| 3,464,528 | 9/1969 | Mork et al. . | |
| 3,908,514 | 9/1975 | Rist | 192/91 R X |
| 4,544,055 | 10/1985 | Kronstadt . | |
| 4,633,992 | 1/1987 | Ishida | 192/85 C |
| 4,729,462 | 3/1988 | Braun | 192/85 C X |
| 4,871,051 | 10/1989 | Whitmer . | |
| 5,042,631 | 8/1991 | Ellenberger et al. . | |
| 5,048,656 | 9/1991 | Braun | 192/85 C |

FOREIGN PATENT DOCUMENTS

| | | | |
|---|---|---|---|
| 616992 | 3/1961 | Canada . | |
| 1086741 | 2/1955 | France | 192/85 C |
| 904264 | 2/1954 | Germany | 192/85 C |
| 1247328 | 9/1971 | United Kingdom . | |

*Primary Examiner*—Andrea L. Pitts
*Attorney, Agent, or Firm*—James J. Dottavio

[57] ABSTRACT

According to this invention, this is obtained by providing a sensor (18) on a clutch linkage (20) or master cylinder (117) to sense the force applied by the operator. The sensor (18) then actuates a valve (36) which provides pressure to a booster cylinder (28). The booster cylinder (28) is connected to the clutch release lever (26) in parallel with the clutch linkage (20) or slave cylinder (117), both of which transmit forces to operate the clutch.

10 Claims, 1 Drawing Sheet

CLUTCH ASSIST MECHANISM

BACKGROUND OF THE INVENTION

1. Field of the Invention

This invention relates to the field of clutch assists for a motor vehicle. More particularly, the invention pertains to a booster system parallel to a conventional manual or hydraulic clutch actuation system.

2. Description of the Prior Art

A manual transmission for use in an automotive vehicle is generally connected to the engine through a friction clutch whose engagement and disengagement is determined by the manual movement of a clutch pedal typically controlled by the vehicle operator with his foot. The efforts in many such applications to release the clutch pedal may be greater than desired for some drivers, particularly in heavy trucks.

A system to reduce the effort required to release a clutch pedal is described in U.S. Pat. No. 4,871,051 ('051) to Whitmer. The system in the '051 patent uses a control valve connected between the clutch pedal and clutch operating lever, so when the clutch pedal is depressed, the linkage rod is compressed to displace a spool in a control valve. As the spool is displaced, the control valve delivers compressed air to a booster cylinder. The booster cylinder in turn applies a proportional force to the clutch operating lever. The '051 patent states in column 3, lines 19–23 that when the air supply to the booster cylinder is lost, the spool in the control valve is pushed against the opposite end of the valve body, and the linkage is pushed directly through the valve.

The '051 patent does not easily package in many designs, because the valve must be mounted on the linkage. Additionally, the movement of the valve requires additional travel of the pedal before the clutch is disengaged. For example, the air supply is exhausted when the pedal is not pressed. Thus the initial force would compress the spring and apply compression to the linkage proportional to the spring rate. The deflection of the spring requires additional travel of the clutch pedal. Upon loss of air pressure in the '051 patent, the valve must be fully stroked before the operator's full force is applied to the linkage, resulting in further pedal travel and slower response in the clutch system. Finally, the proportional force applied by the assist cylinder in the '051 patent results in a clutch system which does not provide the normal clutch pedal feel to the operator.

A second clutch assist design is shown in U.S. Pat. No. 5,042,631 ('631) to Ellenberger et al. The '631 design uses a pneumatic cylinder to cause movement of the clutch. The cylinder receives pressure from a valve which receives input from a sensor based on displacement of the clutch pedal. The valve provides a predetermined air pressure to a pneumatic cylinder to move the clutch based on the displacement of the clutch pedal.

The system shown in the '631 patent relies on air pressure to actuate the cylinder, which in turn operates the clutch; therefore there is an inherent delay in the application of force to the pedal until the valve moves and supplies air to the cylinder, plus the clutch feel to the operator does not come from feedback from the clutch. Additionally, there is no provision in the '631 patent to actuate the clutch if pressure is lost to the cylinder. The feedback (forces) the operator would feel would be that to energize the sensor, not feedback from the clutch. Finally, this system is not easily adaptable to an existing vehicle, as the system shown in the '631 patent would completely replace the conventional system.

It would be desirable to provide a clutch assist mechanism which is adaptable to be retrofitted into existing vehicles, or installed as an original equipment option on new vehicles. Furthermore, such a mechanism should provide the operator with a feel for the clutching forces, be simple, relatively inexpensive, and provide for clutching even when the assist power is lost.

SUMMARY OF THE INVENTION

It is an object of the present invention to provide a clutch assist mechanism which provides a parallel booster force to the clutch when the clutch pedal is depressed. This system should be useful in either an original installation or as a simple add-on to an existing clutch.

According to this invention, this is obtained by providing a sensor on the clutch linkage or master cylinder to sense the force applied by the operator. The sensor then actuates a valve which provides pressure to a booster cylinder. The booster cylinder is connected to the clutch in parallel with the clutch linkages or slave cylinder, both of which transmit forces to operate the clutch.

DESCRIPTION OF THE PREFERRED EMBODIMENT

Figure 1:
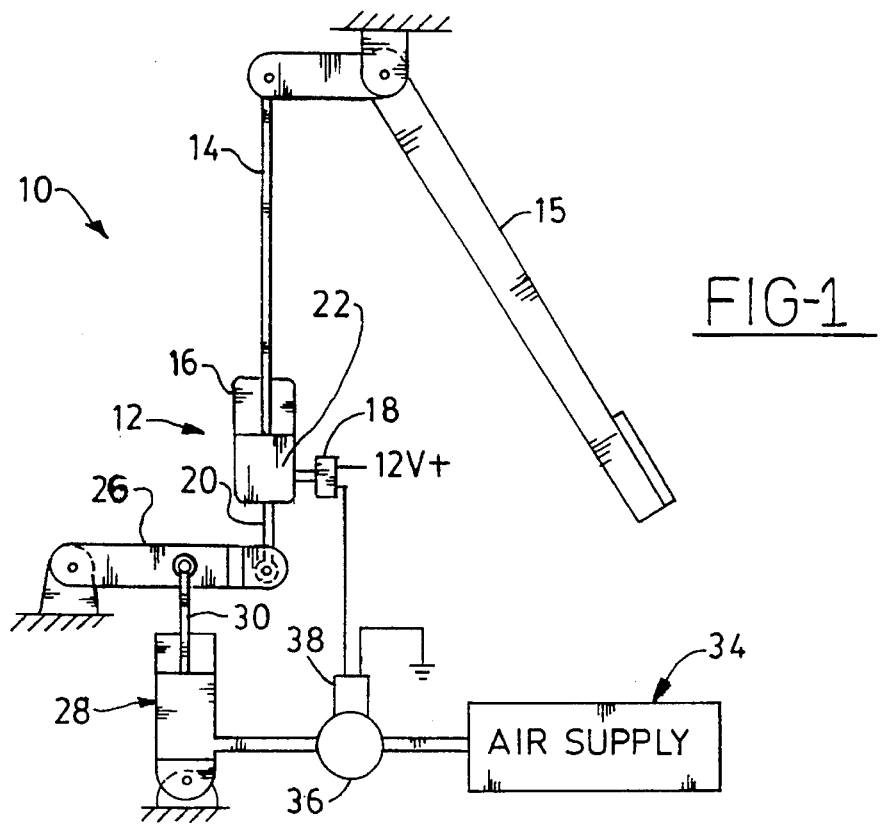
FIG. 1 is a schematic view showing a mechanical clutch system according to the present invention.

Referring first to FIG. 1, a clutch actuation system for a manual transmission is generally shown at 10. In the preferred embodiment, a pedal rod 20 is connected to a second end of a clutch pedal assembly 15, so when the operator pushes on the clutch pedal assembly 15, a manual force is exerted on the pedal rod 20. A force sensing means 12 is added to the clutch pedal rod 20 to measure the force exerted by the operator. In the preferred embodiment, the sensing means 12 comprises a cylinder 16 and sensor 18. The clutch pedal rod 20 communicates a force on the cylinder 16. The force on the cylinder causes a piston 14 inside the cylinder 16 to change the pressure of the fluid 22 within the cylinder 16. The pressure sensor 18 measures the pressure within the cylinder 16 and generates a signal therefrom. The sensing means could be provided by other known structures capable of generating a signal, for example, a strain gage mounted on the piston 14. The sensing means 12 could be added to the clutch pedal 15, clutch release lever 26, or any other component experiencing a force from the operator, either directly or indirectly, during clutching.

In the preferred embodiment, when the sensing means 12 generates a signal, a constant assist force is provided to the clutch regardless of the magnitude of force applied by the operator. Thus the operator is able to apply an increasing amount of force to the pedal 15 to actuate the clutch and feel feedback from the system as he would without an assist, but the force required is of a lower magnitude because of the parallel assist force. Alternatively, the assist force could be a proportional force, based on increasing force applied by the operator.

When the clutch experiences wear, the clutch pedal 15 will travel further. Because the sensor 12 detects forces or pressure, as opposed to linear travel, the additional linear travel of the clutch pedal 15 after the clutch wears will not affect the function of the assist mechanism in this system.

The cylinder 16 of the sensing means 12 is connected at a second end to a second part of the pedal rod 20. The forces applied to the cylinder 16 are transmitted to the second part of the pedal rod 20, which translates this force to a clutch release lever 26, which causes the clutch (not shown) to disengage. As the pedal 15 is released, the clutch returns to an engaged position.

An assist cylinder 28 is also connected to the clutch release lever 26. In the preferred embodiment, the assist cylinder 28 is a pneumatic cylinder with the cylinder mounted to the clutch housing (not shown). The piston 30 of the assist cylinder 28 is connected with the clutch release lever 26, generally parallel to the pedal rod 20. Thus when the assist cylinder 28 is pressurized, the piston 30 exerts a force on the clutch release lever 26 generally parallel to the force of the pedal rod 20 to operate the clutch.

In the preferred embodiment, the assist cylinder 28 is pressurized with air from an available source 34 in the vehicle, as is well known in the art, but could be a hydraulic system or any known equivalent. A valve 36 is provided to regulate the flow of air from the air supply 34 to the assist cylinder 28. A solenoid 38 acts as a means to adjust the valve 36, by actuating the valve 36 based upon the signal from the pressure sensor 18.

Figure 2:
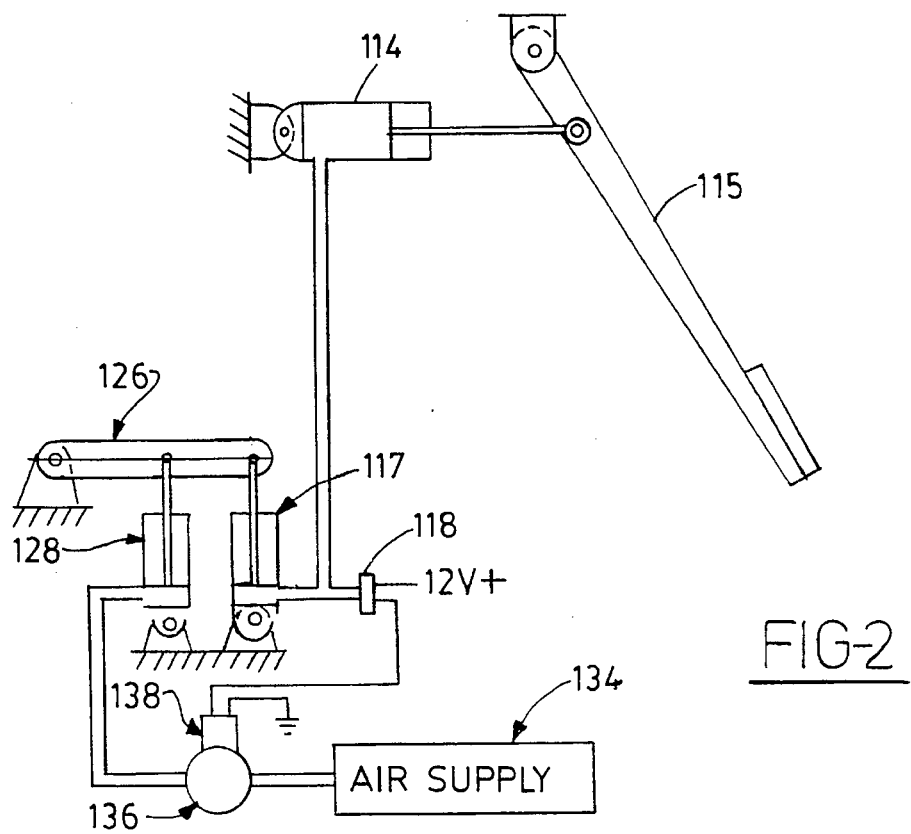
FIG. 2 is a schematic view showing a hydraulic clutch system according to the present invention.

In an alternate embodiment, the mechanical linkage system is replaced with a hydraulic system, which provides a force to the clutch system as shown in FIG. 2. The operator applies a manual force to the clutch pedal assembly 115; the manual force actuates a master cylinder 114, creating a pressure which is communicated with a slave cylinder 117. As the slave cylinder 117 is pressurized, it exerts a force proportional to the manual force on the clutch release lever 126, which actuates the clutch. An assist cylinder 128 is connected to the release lever 126, and mounted substantially parallel to the slave cylinder 117. A pressure sensor 118 is connected to the master cylinder 114, slave cylinder 117, or therebetween; the sensor 118 senses the pressure of the fluid supplied to the slave cylinder 117, which is proportional to the force applied by the operator at the clutch pedal 115. The sensor 118 generates a signal which is transmitted to a solenoid 138, and which actuates a valve 136. The valve 136 regulates a supply of pressurized air or hydraulic fluid 134 to the assist cylinder 128, thereby regulating the amount of force the assist cylinder 128 provides to the clutch release lever 126. Alternatively, a force sensor could be mounted to the clutch pedal 115 or any other member experiencing forces from the manual force applied by the operator as described in the preferred embodiment.

As shown in FIGS. 1 and 2, the assist cylinder 28, 128 in each of the embodiments described above is mounted to the clutch release lever 26, 126 in parallel to the manual force applied by the operator through a linkage 14 or master & slave cylinder 114, 117. Thus, if the assist cylinder 28, 128 fails due to loss of pressure or any other reason, the clutch will continue to be operable through the linkage 14 or slave cylinder 117, but without the assist force.

It is understood that although the form of the invention shown herein and described constitutes the preferred embodiment of the invention, it is not intended to illustrate all possible forms thereof. It will also be understood that words used are words of description rather than a limitation, and that various changes may be made without departing from the spirit and scope of the invention as disclosed.

I claim:

1. A clutch actuation device for assisting the operation of a clutch manipulated by applying a manual force, the actuation device comprising: a clutch release lever adapted to be connected to the clutch;

means for manually applying the force to the clutch through said clutch release lever;

means for sensing the manual force;

an assist cylinder, operatively connected to said clutch release lever generally parallel to said manual force application means;

a pressure source connected to said assist cylinder;

a valve for regulating flow from said pressure source to said assist cylinder;

a means for adjusting said valve based on the force sensed by said sensing means.

2. The clutch actuation device of claim 1, wherein said manual force means comprises:

a manually operated actuator moveable between a clutch applied position and a clutch released position; and a first linkage having first and second ends, said first end operatively connected to said actuator, and said second end operatively connected to said clutch release lever.

3. The clutch actuation device of claim 2, wherein said force sensing means comprises:

a control cylinder with first and second ends, said cylinder being operatively attached to said manually operated actuator at a first end and operatively connected to said clutch release lever at a second end;

a pressure sensor to sense the pressure within said control cylinder, wherein said sensor generates a signal when said control cylinder is pressurized.

4. The clutch actuation device of claim 3, wherein the means for adjusting said valve comprises a solenoid operatively connected to said valve and said sensor, wherein when said sensor generates said signal, said valve is adjusted a proportional amount.

5. The clutch actuation device of claim 3, wherein the means for adjusting said valve comprises a solenoid operatively connected to said valve and said sensor, wherein when said sensor generates said signal, said valve is opened to apply a constant pressure to said assist cylinder.

6. A clutch actuation device for assisting the operation of a clutch manipulated by applying a manual force, the actuation device comprising:

a manually operated actuator moveable between a clutch applied position and a clutch released position;

a master cylinder comprising a piston connected to the manual actuator;

a slave cylinder having first and second ends hydraulically connected to the master cylinder at the first end;

a clutch release lever having first and second ends, said release lever being adapted to be connected to the clutch at the first end of said release lever, and said release lever being operatively connected to the second end of said slave cylinder at the second end of said clutch release lever;

means for sensing the manual force;

an assist cylinder, operatively connected to said clutch release lever generally parallel to said slave cylinder;

a pressure source connected to said assist cylinder;

a valve for regulating flow from said pressure source to said assist cylinder;

a means for adjusting said valve based on the force sensed by said sensing means.

7. The clutch actuation device of claim 6, wherein said force sensing means comprises a pressure sensor to sense the pressure within said master cylinder, wherein said sensor generates a signal when said master cylinder is pressurized.

8. The clutch actuation device of claim 7, wherein the means for adjusting said valve comprises a solenoid operatively connected to said valve and said sensor, wherein when said sensor generates said signal, said valve is adjusted a proportional amount.

9. The clutch actuation device of claim 7, wherein the means for adjusting said valve comprises a solenoid operatively connected to said valve and said sensor, wherein when said sensor generates said signal, said valve is opened to apply a constant pressure to said assist cylinder.

10. A method for reducing the manual force required to actuate a clutch having a clutch release lever, a sensor, a solenoid, a valve, and an assist cylinder in an automotive vehicle, comprising the steps of:

sensing the manual force applied to a clutch pedal using a sensor;

generating a signal based on the manual force sensed by the sensor;

energizing a solenoid with the signal from the sensor to adjust a valve to supply pressure to an assist cylinder; and applying a second force to the clutch release lever from the assist cylinder, the second force being applied substantially parallel to the force applied to the clutch release lever by the manual force.

* * * * *